O. S. SCHAIRER.
GEAR SHIFTING MECHANISM.
APPLICATION FILED MAR. 18, 1914. RENEWED JUNE 13, 1918.

1,363,675.

Patented Dec. 28, 1920.
2 SHEETS—SHEET 1.

WITNESSES:
R. J. Ridge.
J. R. Langley

INVENTOR
Otto S. Schairer
BY
Wiley E. Carr
ATTORNEY

O. S. SCHAIRER.
GEAR SHIFTING MECHANISM.
APPLICATION FILED MAR. 18, 1914. RENEWED JUNE 13, 1918.

1,363,675.

Patented Dec. 28, 1920.
2 SHEETS—SHEET 2.

WITNESSES:
P. J. Ridge.
J. R. Langley.

INVENTOR
Otto S. Schairer
BY Wesley G. Carr
ATTORNEY

UNITED STATES PATENT OFFICE.

OTTO S. SCHAIRER, OF PITTSBURGH, PENNSYLVANIA, ASSIGNOR TO WESTINGHOUSE ELECTRIC AND MANUFACTURING COMPANY, A CORPORATION OF PENNSYLVANIA.

GEAR-SHIFTING MECHANISM.

1,363,675. Specification of Letters Patent. Patented Dec. 28, 1920.

Application filed March 18, 1914, Serial No. 825,597. Renewed June 13, 1918. Serial No. 239,883.

*To all whom it may concern:*

Be it known that I, OTTO S. SCHAIRER, a citizen of the United States, and a resident of Pittsburgh, in the county of Allegheny and State of Pennsylvania, have invented a new and useful Improvement in Gear-Shifting Mechanism, of which the following is a specification.

My invention relates to gear shifting mechanisms for automobiles or other motor vehicles, and it has particular reference to those mechanisms in which the selection of the gears is effected by means mounted upon the steering head or otherwise conveniently located, and their shifting is effected by the clutch pedal or other suitable means.

The object of my invention is to provide an arrangement by means of which the gear shifting mechanism may be selectively and effectively controlled solely by mechanical devices.

It has been proposed to provide gear shifting mechanisms which are selectively controlled by systems comprising electromagnets, a battery, and push buttons for controlling the electrical connections of the magnets and the battery. While such devices may operate satisfactorily, a large number of parts are required and these are, by their nature, comparatively expensive. In addition, the services of skilled electricians are necessary in assembling and installing an electrically operated mechanism.

In the present invention, I provide a structure that is entirely mechanical in construction and in operation. The changes in speed ratio are selected in advance of the actual change, by the positioning of a pointer or indicator located upon the steering post of the vehicle. The mechanism is actuated by the clutch pedal to shift the gear mechanism to produce the desired change in speed ratio. The clutch pedal is arranged to actuate the gear shifting mechanism only upon the movement of the clutch pedal beyond the point at which the clutch is disengaged.

Figure 1:
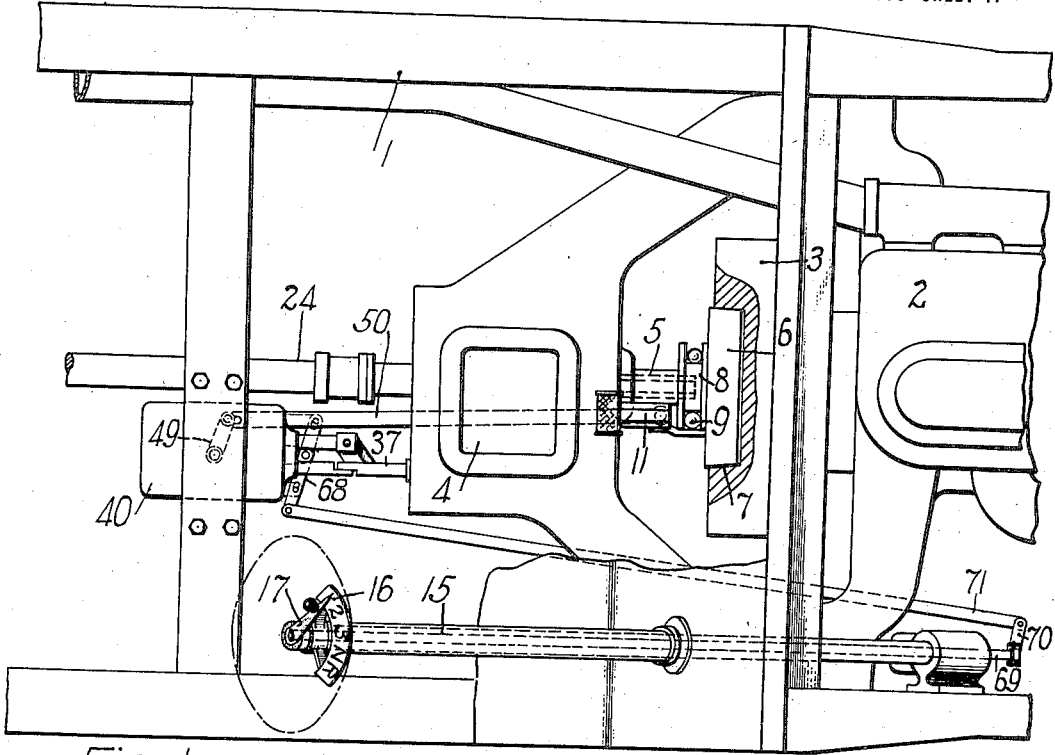
Figure 2:
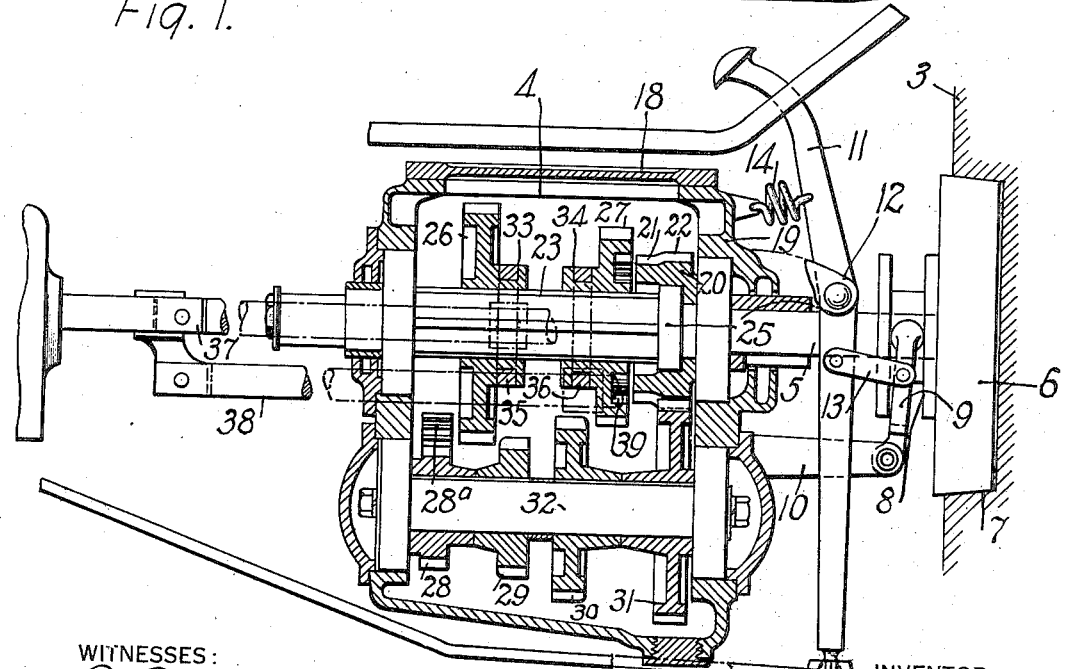
Figure 3:
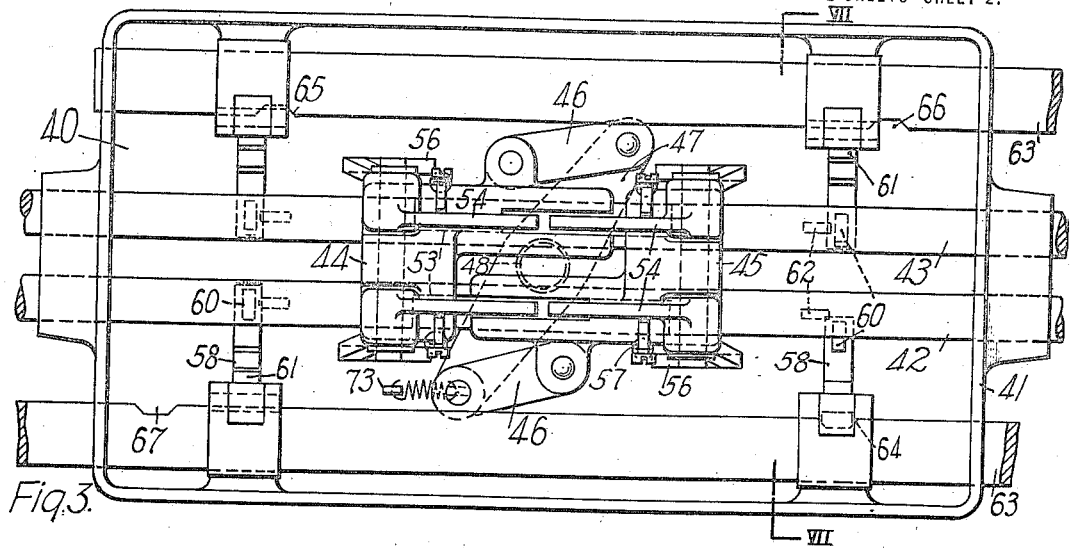
Figure 4:
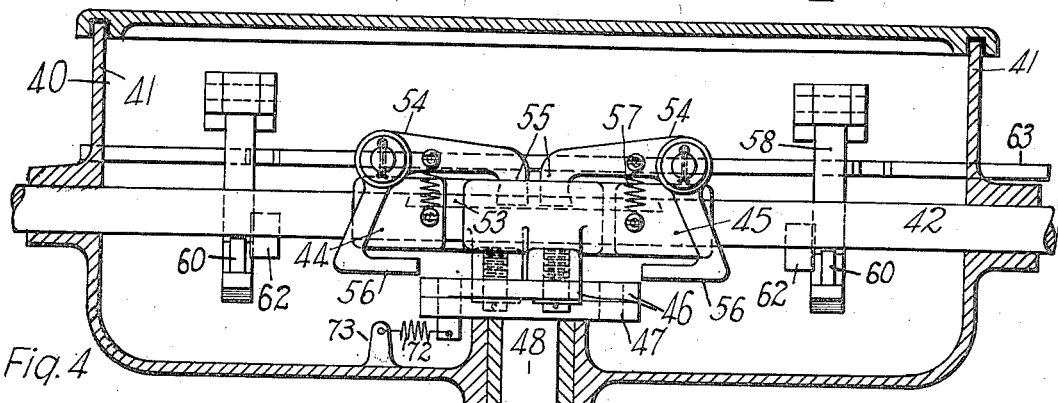
Figure 6:
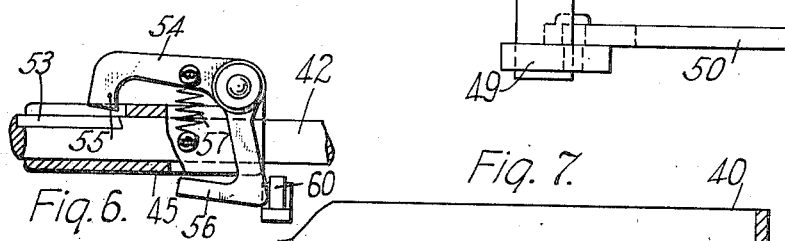
Figure 7:
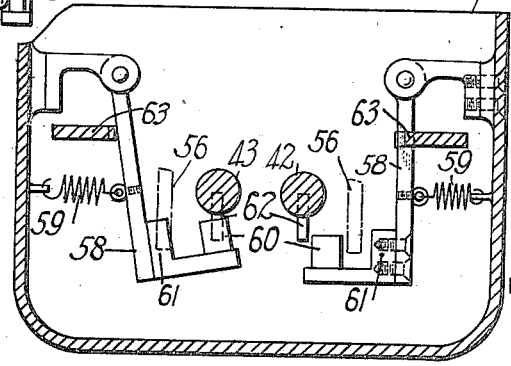
Figure 5:
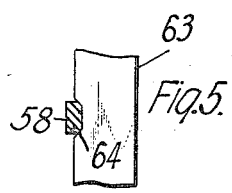

In the accompanying drawings, Figure 1 is a view, partially in plan and partially in section, of a portion of an automobile having my invention attached thereto. Fig. 2 is a view, partially in elevation and partially in section, of the transmission mechanism of an automobile and its related parts. Fig. 3 is a plan view of the gear-shifting mechanism. Fig. 4 is a view, in longitudinal section, of the mechanism of Fig. 3. Figs. 5 and 6 are views of details. Fig. 7 is a view, in section, on line VII—VII of Fig. 3.

Referring particularly to Figs. 1 and 2, an automobile chassis 1, only a portion of which is shown, is provided with a gas engine 2 having a fly wheel 3. A transmission mechanism or change-speed gear mechanism 4 is connected to the engine 2 by a shaft 5 and a conical clutch member 6 that is slidably mounted on the shaft 5 to coact with a correspondingly shaped clutch member 7 formed in the fly wheel 3. The clutch member 6 is provided with an integral grooved collar 8 that is adapted to be engaged by a yoke member 9 having a pivotal support upon a bracket 10. A pedal lever 11, that is adapted to be operated by the foot of the operator, has a pivotal support upon a lug 12 and is connected by a link 13 to the yoke member 9. A spring 14, that is attached at one end to a suitable stationary part, normally retains the clutch pedal lever 11 in its rearward position, with the clutch member 6 engaging the clutch member 7 in the fly wheel 3. A steering post 15 is provided with a dial 16 having characters corresponding to the several speed ratios, as, for example, 1, 2, 3, N (neutral) and R (reverse). A lever or pointer 17, which is rotatably mounted on the steering post 15, selectively controls the shifting of the gear wheels of the transmission mechanism, as will be later described.

The transmission mechanism 4 forms no part of my invention but is so combined therewith that a description thereof is desirable in order to explain the operation of the gear-shifting mechanism. The shaft 5, which is connected to the clutch member 6, extends into the transmission casing 18 through an end wall 19 and has a bearing therein. A gear wheel 20, having two sets of gear teeth 21 and 22, is mounted upon the shaft 5 within the casing 18. A transmission shaft 23, which is connected to the main transmission shaft 24, is in axial alinement with the shaft 5 and has a bearing at 25 within the gear wheel 20. The shaft 23 is adapted to be connected to the shaft 5 at different speed ratios by means of two gear wheels 26 and 27 that are slidably keyed upon the shaft 23, gear wheels 28, 29, 30 and 31 that are fixed upon a counter shaft 32, and an idler gear wheel 28ª that is in mesh with the gear wheel 28.

The gear wheel 31 is always in mesh with the gear teeth 22 to establish a fixed speed ratio between the shafts 5 and 32. The mechanism is arranged to provide three speeds in the forward and one in the reverse direction. The changes in speed ratio are controlled by the slidable gear wheels 26 and 27 which are respectively provided with integral grooved collars 33 and 34 to be engaged by yoke members 35 and 36. The yoke members 35 and 36 are respectively fixed upon shift rods 37 and 38 that are controlled by the gear-shifting mechanism, as will be later described.

When the gear wheel 26 is in mesh with the gear wheel 29, the mechanism is in its first or low-speed position and the shaft 5 is connected through the gear teeth 22, gear wheel 31, counter shaft 32 and gear wheels 29 and 26 to the transmission shaft 23. For the second or intermediate speed, the gear wheel 27 is shifted into mesh with the gear wheel 30. For the third or high speed, the gear wheel 27 is shifted to the right until internal gear teeth 39, with which the gear wheel 27 is provided, mesh with the gear teeth 21. The shaft 5 is then directly connected to the transmission shaft 23 and the latter is driven at engine speed. For driving in the reverse direction, the gear wheel 26 is shifted into mesh with the idler gear wheel 28ª, which is always in mesh with the gear wheel 28. The transmission mechanism is illustrated in its neutral or inoperative position in which the shaft 23 is not connected to the counter shaft 32.

Referring now to Figs. 3 to 7, inclusive, the gear shifting mechanism comprises a housing or casing 40 having end walls 41 which provide bearings for two shift rods 42 and 43. The shift rods 42 and 43, which are slidable axially in their bearings, are respectively connected to the shift rods 37 and 38 of the transmission mechanism. Two blocks 44 and 45 are slidably mounted upon the shift rods 42 and 43. The blocks 44 and 45 are connected by links 46 to the oppositely extending arms of a lever 47, the oscillation of which operates to slide the blocks 44 and 45 in opposite directions simultaneously. The lever 47 is fixed upon a rock shaft 48 that is provided with a crank arm 49. A link 50, which has a pin-and-slot connection with the crank 49, is connected to the lower end of the pedal lever 11.

Each of the shift rods 42 and 43 is provided with a longitudinal groove 53. Four dogs 54, that are pivotally mounted on opposite sides of the blocks 44 and 45, are each provided at one end with a hook portion 55 for engaging the respective shift rods 42 and 43. Each of the dogs 54 is provided, at its opposite end, with a horizontally extending portion 56. Normally, the dogs 54 are retained in the positions shown in Fig. 4 by springs 57, with the hook portions 55 resting upon the bottoms of the grooves 53.

Four stop members 58, of substantially L-shape, are pivotally supported upon the side walls of the housing 40, and are normally held in positions adjacent the side walls of the casing 41 by springs 59. Each stop 58 comprises vertical portions 60 and 61 which coact, respectively, with lugs 62 on the shift rods and with the several dogs 54. The stops 58 are controlled by two notched bars 63, which are slidably mounted adjacent to the respective side walls of the casing 40. The inner edges of the bars 63 are provided with notches 64, 65, 66 and 67 which, when in register with the corresponding stops 58, allow the stop members to be retained in their normal positions by the springs 59. Referring now to Fig. 1, each of the bars 63 is pivotally connected to a double-armed lever 68. The pointer 17 is fixed to a rotatably mounted rod 69 which is connected to the lever 68 by a crank arm 70 and a link 71.

It may be assumed that the transmission gear mechanism is in its neutral position, as illustrated in Fig. 2, and that the gear-shifting mechanism is in its corresponding normal or neutral position. It may be assumed, also, that the engine has been started and that the engine clutch members 6 and 7 are disengaged. It is desirable to start the vehicle on first speed, and the pointer 17 is accordingly adjusted to register with the numeral 1 on the dial 16. The bars 63 are adjusted thereby to bring a notch 64 into register with its corresponding stop 58 and the latter is retracted by its spring 59. As shown in Fig. 7, the stop 58, which has thus been actuated, now occupies such a position that the vertical portions 60 and 61 occupy positions outside the paths of movement of the lugs 62 and of the dogs 54, respectively. The remaining stops 58, however, are in the positions corresponding to that of the stop 58 shown at the left in Fig. 7, with the vertical portions 60 and 61 in positions to obstruct the movements of the respective coacting lugs 62 and the dogs 54.

The clutch pedal lever 11, which, at the time of starting the engine, is in such a position that the engine clutch members 6 and 7 are out of engagement, is then pressed forwardly beyond the clutch-disengaging position to rock the lever 47 and thus actuate the blocks 44 and 45 outwardly, the hook portions 55 of the dogs 54 sliding along the grooves 53. When the hook portions 55 approach the ends of the grooves, the dogs 54, with the exception of that one coacting with the shifted stop 58, engage the corresponding stops 58, and the dogs are rocked about their pivots to raise the hook portions 55 from the grooves 53. Further movement of the blocks causes the dog 54 that is not rocked to engage the rod 42 and move it to the right (Figs. 3 and 4) to mesh the gear wheel 26 with the gear wheel 29.

When the gear wheels are fully meshed, the operator allows the spring 14 to retract the clutch pedal lever 11. A spring 72, that is attached at one end to a stationary lug 73 and at the other end to the lever 47, returns the blocks 44 and 45, and the rock shaft 48 to their respective normal positions. The several dogs 54 are thus returned to their respective normal positions, and the springs 57 draw the dogs 54 downwardly as soon as the hook portions 55 have passed the ends of the grooves 53. The engine clutch is still out when the various parts are in their respective normal or neutral positions. Further return movement of the clutch pedal will effect the engagement of the engine clutch and the vehicle will be driven through the connections above described. The clutch can then be controlled as desired without in any way affecting the transmission gear mechanism, the pin-and-slot connection permitting the necessary independent movement of the pedal lever 11.

When it is desired to change the speed ratio, as, for example, to second speed, the pointer 17 may be moved to register with the corresponding numeral on the dial 16 at any time desired in advance of the actual change. The notch 65 is thereby brought into register with its corresponding stop 58 to perform the same functions as described in connection with the notch 64. To effect the change to the desired speed, the operator presses the pedal lever 11 to disengage the engine clutch. The rod 42 is in its shifted position and the left end of the groove 53 is near the coacting hook portion 55 of the adjacent dog 54, so that a slight outward movement of the latter member will cause these parts to engage. The further actuation of the pedal lever 11 after the clutch is out, therefore, first operates to shift the rod 42 to its neutral position. At this point, all of the dogs 54, except that one controlled by the notch 65, have engaged their corresponding coacting stops 58, and the dogs 54 are rocked out of engagement with the respective shift rods 42 and 43. But, since the notch 65 is in register with its corresponding stop 58, the coacting dog 54 is still in operative position, and the further movement of the clutch pedal lever 11 causes the rod 43 to be shifted to the left, and the gear wheel 27 to be shifted into mesh with the gear wheel 30. The return movement of the pedal lever 11 by the spring 14 effects engagement of the engine clutch, and the vehicle will be driven at second speed. In the same manner, changes may be made to third speed, or the direction of drive may be reversed by adjusting the pointer 17 to register with the appropriate characters 3 and R, respectively. It will, of course, be understood that, in order to reverse the direction of the vehicle, it is necessary to bring it to a stop before the clutch is thrown in.

When it is desired to return either of the shiftable gear wheels 26 and 27 to the neutral position, the pointer 17 is adjusted to register with the letter N on the dial 16. In this position of the pointer, the bars 63 are so positioned that none of the notches register with the corresponding stops 58. The clutch is disengaged as before, whereupon the lever 47 is actuated by the rock shaft 48 to shift the blocks 44 and 45 outwardly. The shifted rod is in a position to be engaged immediately by the appropriate dog 54 to return it to its normal or neutral position. When the dogs 54 reach the stops 58, all of the dogs 54 are rocked out of the grooves 53, since none of the stops 58 are shifted outwardly. It is then impossible to shift the gear wheels until the pointer 17 has been shifted to a position other than in register with the letter N.

It will be noted that I have provided a mechanism which is controlled by a simple device that is conveniently located both for operation and for observation by the driver of the vehicle. By employing mechanical means only, I provide a mechanism that is much simpler in construction and in operation than one which embodies electrical means for controlling or for actuating the shifting mechanism. A device constructed in accordance with my invention may be of rigid and substantial construction, thus avoiding any necessity for frequent adjustment and repair.

I claim as my invention:

1. In a gear shifting mechanism, the combination with a shift rod, two members movable longitudinally of the rod in opposite directions and means for connecting said members to said shift rod, of mechanical means for selectively controlling the connection of said members to said rod, said controlling means being operable to select a connection while the rod is in a shifted position.

2. In a gear shifting mechainsm, the combination with a shift rod, and two members movable longitudinally of the rod in opposite directions, of means carried by the said members for connecting them to the shift rod, and mechanical means for selectively controlling the said connecting means.

3. In a gear shifting mechanism, the combination with a shift member, and a plurality of members that are simultaneuously movable in opposite directions relatively thereto, of a plurality of pivotally mounted levers for connecting said movable members to said shift member, and mechanical means for selectively rendering said levers inoperative.

4. In a gear shifting mechanism, the combination with a shift member, and two members movable relatively to the shift member in opposite directions, of means for connecting the latter members to the shift member, and means comprising stops and a recessed member for selectively controlling said connecting means.

5. In a gear shifting mechanism, the combination with a shift member, and means for actuating said member in opposite directions from a neutral position, of mechanical means for selectively controlling said actuating means and for preventing the actuation of said member other than in the selected direction.

6. In a gear shifting mechanism, the combination with a shift rod, and two members movable longitudinally of the rod in opposite directions, of means carried by the said members for connecting the members to the shift rods, stops that prevent the connection of said parts, and mechanical means for selectively controlling said stops.

7. In a gear shifting mechanism, the combination with a shift member, and a plurality of members that are simultaneously movable in opposite directions relatively thereto, of means comprising pivotally mounted levers for connecting the movable members to the shift member, and mechanical means for selectively controlling said connecting means.

8. In a gear shifting mechanism, the combination with a shiftable gear wheel, a plurality of members simultaneously shiftable in opposite directions, means for connecting said members to said gear wheel, of means for selectively controlling said connecting means, said controlling means comprising an indicating mechanism, and a recessed member connected to said indicating mechanism.

9. In a gear shifting mechanism, the combination with a shift rod, and two members movable longitudinally of the rod in opposite directions, of means for connecting the said members to the shift rod, means for preventing the connection of the said parts, and mechanical means for selectively controlling the said preventing means.

10. In a gear shifting mechanism, the combination with a shiftable gear wheel and a shift rod connected thereto, of two members movable longitudinally of said rod, means carried by said members for connecting them to said rod, means for selectively controlling said connecting means, said means comprising a plurality of stops, a recessed member coacting with said stops, and an indicating mechanism connected to said recessed member.

11. In a gear shifting mechanism, the combination with a shift rod and two members movable longitudinally of the rod in opposite directions, of means carried by said members for connecting them to said rod, and means for selectively controlling said connecting means, said controlling means comprising members movable transversely relatively to said rod, an indicating mechanism, and slidable members connected to said indicating mechanism and coacting with said transversely movable members.

In testimony whereof, I have hereunto subscribed my name this 24th day of Feb. 1914.

OTTO S. SCHAIRER.

Witnesses:
J. R. LANGLEY,
B. B. HINES.